(12) United States Patent  
Nusbaum et al.

(10) Patent No.: US 6,988,645 B1  
(45) Date of Patent: Jan. 24, 2006

(54) BICYCLE RACK ANTI-SWAY STABILIZER

(76) Inventors: Neil H. Nusbaum, 4413 Keystone Ave., Culver City, CA (US) 90232; F. Andre Levy, 20680 Via Amarilla, Yorba Linda, CA (US) 92886

( * ) Notice: Subject to any disclaimer, the term of this patent is extended or adjusted under 35 U.S.C. 154(b) by 0 days.

(21) Appl. No.: 10/368,076

(22) Filed: Feb. 20, 2003

(51) Int. Cl.  
*B60R 11/00* (2006.01)

(52) U.S. Cl. .................... 224/519; 224/537; 224/553; 224/572; 224/924; 224/324

(58) Field of Classification Search ............... 224/519, 224/495, 502, 505, 506, 522, 533, 535, 536, 224/537, 545, 548, 552, 553, 567, 572, 324, 224/935, 924, 421, 425–427  
See application file for complete search history.

(56) References Cited

U.S. PATENT DOCUMENTS

| | | | |
|---|---|---|---|
| 4,856,686 A | | 8/1989 | Workentine |
| 5,052,605 A | * | 10/1991 | Johansson .................... 224/324 |
| 5,056,699 A | * | 10/1991 | Newbold et al. ............ 224/314 |
| 5,259,542 A | | 11/1993 | Newbold et al. |
| 5,573,165 A | * | 11/1996 | Bloemer et al. ............ 224/537 |
| 5,598,960 A | * | 2/1997 | Allen et al. .................. 224/324 |
| D378,289 S | * | 3/1997 | Lundgren .................. D12/412 |
| 5,647,520 A | * | 7/1997 | McDaid ...................... 224/425 |
| 5,662,255 A | * | 9/1997 | Lu ............................. 224/451 |
| 5,775,555 A | | 7/1998 | Bloemer et al. |
| 6,286,738 B1 | | 9/2001 | Robins et al. |
| 6,467,664 B2 | * | 10/2002 | Robins et al. ............ 224/537 |
| 6,616,023 B1 | * | 9/2003 | Dahl et al. .................. 224/537 |
| 6,732,893 B2 | * | 5/2004 | Morris et al. ............... 224/537 |

* cited by examiner

*Primary Examiner*—Tri M. Mai  
(74) *Attorney, Agent, or Firm*—Gordon K. Anderson (57) ABSTRACT

The object of the invention is to provide an anti-sway stabilizer (20) that is pivotally connected to a support arm (26) of a vehicle bike transportation rack, making available a convenient attachment of a bicycle top tube to the support arm for prevention of a bicycle held on the rack from swaying to and fro when subjected to over the road vehicle movement. The anti-sway stabilizer consists of a rubber bike separator cradle (22) that includes a bore (24) therethrough that slides over the vehicle bike rack support arm and has a thru-hole (28) parallel with the bore. A pivoting stabilizer member (32) in the form of a yoke (36) is rotatably attached to the bike separator cradle with a screw (40) and nut (42). An attachment strap (48) secures a bicycle top tube to the bike separator cradle and a second attaching strap (48) secures a bicycle seat tube or down tube to the stabilizer member. The anti-sway stabilizer is held in place on the support arm by the combination of the separator cradle being resilient and the rigid stabilizer member contiguously engaging the support arm which precludes any lateral movement along the arm when a force is exerted in a horizontal direction biasing the anti-sway stabilizer.

10 Claims, 6 Drawing Sheets

BICYCLE RACK ANTI-SWAY STABILIZER

TECHNICAL FIELD

The present invention relates to anti-sway devices in general. More specifically to an anti-sway stabilizer that is pivotally attached to rubber bike separator that is strapped onto a bicycle top tube along with either a seat tube or down tube.

BACKGROUND ART

Previously, many types of anti-sway stabilizers have been used in endeavoring to provide an effective means to prevent a bicycle held on a vehicle bike transportation rack from swaying sideways due to the over the road movement of the vehicle. In most cases the prior art uses a stabilizer that is pivotally mounted on the arm of the bicycle rack or is integrated into the device itself.

The prior art listed below did not disclose patents that possess any of the novelty of the instant invention; however the following U.S. patents are considered related:

| U.S. Pat. No. | Inventor | Issue Date |
|---|---|---|
| 4,856,686 | Workentine | Aug. 15, 1989 |
| 5,259,542 | Newbold et al. | Nov. 9, 1993 |
| 5,775,555 | Bloemer et al. | Jul. 7, 1998 |
| 6,286,738 | Robins et al. | Sep. 11, 2001 |
| 6,467,664 | Robins et al. | Oct. 22, 2002 |

Workentine in U.S. Pat. No. 4,856,686 teaches a bicycle, or cargo, carrier mounted to a vehicle that includes a receiver type hitch. The carrier has an upright support with a rectangular collar fixed to the lower end and a bicycle carrier at its upper end. The collar slides on to a conventional carrier insert and is secured by a bolt. The carrier utilizes a structural bar positioned horizontally for bicycle attachment.

U.S. Pat. No. 5,259,542 issued to Newbold et al. is for an anti-sway device for releasably securing a bicycle to a motor vehicle mounted carrier. The device has a two piece locking member that is slid onto a support arm of the carrier and adjustably positioned along the length by rotation of an eccentric locking sleeve. The invention has an upper channel surface surrounding the locking sleeve for grasping the bicycle top tube. A second pivotal member distends from the locking member and attaches to either the down tube or the seat tube of the bicycle with a strap. The second pivotal member is adjustable to any angular relationship between members.

Bloemer et al. in U.S. Pat. No. 5,775,555 discloses a single arm bicycle rack holder using an L-shaped support with a rearwardly extending arm formed of thin-walled tube. The end of the support is formed into a U-shape double walled channel which fits between the sides of a brace which is rigidly mounted to the trailer hitch. A plastic bracket has a split ring clamp which fits over the arm of the support. A second embodiment utilizes a single molded part of thermoplastic rubber. The attachment device has a strap with an array of holes engaging fastener straps.

Robins et al. in U.S. Pat. No. 6,286,738 teaches a bicycle carrier rack that includes an adjustable frame assembly with two members attached to a housing allowing a pivotal movement. A locking member is positioned within the housing and impedes rotational movement. One support arm is coupled to the housing and selectively pivots between a stowed position and an extended position. A mounting assembly on the support arm holds the bicycle in place during travel.

U.S. Pat. No. 6,467,664 issued to Robins et al. is a continuation of Robins et al. above patent '738 only it deals with a combination of a saddle mount and a stabilizer each mounted on the same bicycle rack horizontal arm rather than the pivoting bicycle rack itself. The saddle mount slides onto the rack horizontal arm and engages the bicycle top tube while gripping the bicycle frame without damage. One or more tie down members are used to prevent accidental dislodgement. A stabilizer, having a pair of collars, fit on either side of the saddle mount and independently pivot about the rack horizontal arm in a free manner. The stabilizer also uses at least one tie down member for securement.

DISCLOSURE OF THE INVENTION

Bicycle racks have been very popular for a number of decades and include many and varied styles for different types of motor vehicles and number of bicycles to be transported. Typically bike racks employ at least one horizontal bicycle rack support arm; however, there are some that include channel like rails allowing the bike wheels to support the weight with an upper diminutive arm to stabilize the bicycle.

Figure 13:
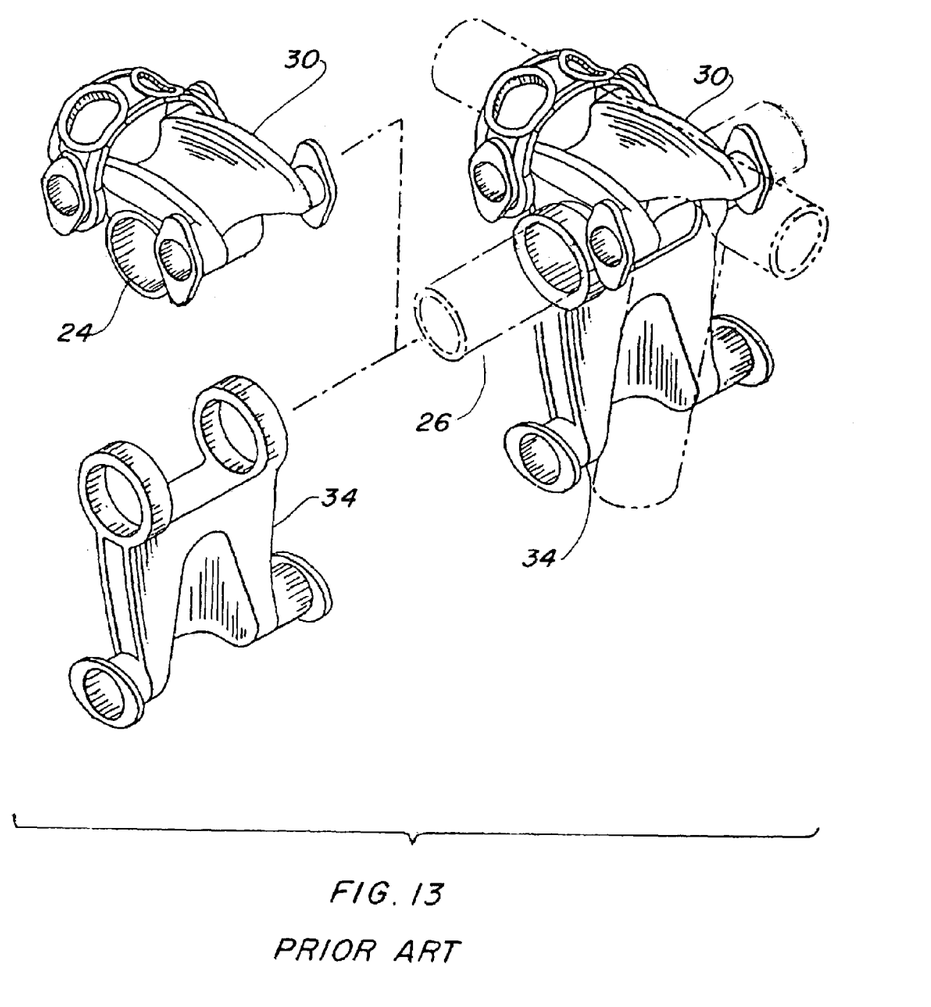
FIG. 13 is an exploded view of two separate elements of the prior art attached to a portion of a support arm of a bicycle support rack shown dotted.

One of the problems with supporting the bicycle on a horizontal arm is overcome with the use of a resilient separator for spacing bicycles apart and to provide a retained cushioned rest. While this type of separator is well accepted and in common use, the problem of the bicycle swaying sideways due to the over the road movement of the vehicle still exists. Prior art, such as illustrated in FIG. 13, has attempted to address this problem by using a bifurcated yoke that embraces a conventional separator with one ring on each side and mounts directly on the horizontal arm of the rack as described in U.S. Pat. No. 6,467,644. While this approach appears to satisfy the basic requirements of eliminating the sway, the combined yoke and separator have the ability to slip horizontally along the rack arm as there is no limiting factor built into the design.

It is therefore the primary object of the invention to address this problem by using a stabilizing member that is made of rigid thermoplastic instead of the Santoprene synthetic rubber employed in the '644 patent. The improvement attaches the separate stabilizing member to the bottom of a separator saddle with its yoke narrower than the cradle width, creating an interference fit formed by the resilience of the separator cradle. This tight fit allows the stabilizer member to rotate under resistance and basically maintains its position under tension. In the instant invention this pivoting stabilizer member includes not only the integrally formed radial yoke but includes a pair of aligned round openings therethrough with the yoke sized to fit over the separator cradle and is attached by the capscrew and locknut. The radial yoke also contiguously engages the support arm where the two radiuses intersect. It has therefore been found that the combination of the separator cradle being resilient and the rigid stabilizer member contiguously engaging a small portion of the support arm precludes any lateral movement along the arm when a force is exerted in a horizontal direction on the anti-sway stabilizer biasing the two elements together. This improvement permits the anti-sway stabilizer to remain in its original position and is unaffected by road shock and vibration.

An important object of the invention is the ease of removal of the pivoting stabilizer in the event small bicycles are sufficiently supported and do not require stabilization. This removal of the stabilizing member is accomplished be simply inserting an Allen wrench in the exposed head of the capscrew and rotating the screw until it is free of the threads where it may be removed with ones fingers since the nut is captured in the opposite end of the yoke.

The another rather obvious object of the invention is directed to its positive ability to prevent the bicycle mounted on the carrier rack from swaying on the carrier itself as the inertia presented by the vehicle urges the bicycle to sway angularly during stops and starts. When multiple bicycles are mounted closely together a damage potential is presented. As mentioned above the problem of misalignment is solved by the instant invention and the attachment of a strap anchor to both the top tube and either the down tube or seat tube simultaneously achieves the goal of damage prevention.

A final object of the invention is its fully adjustable nature as the anti-sway device is easily adjusted to fit almost all conventional bicycles, and the methods of attachment are intuitively obvious to the user.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment. This preferred embodiment of the anti-sway stabilizer 20 is shown in FIGS. 1 thorough 12 and is comprised of two major elements.

Figures 1, 1A:
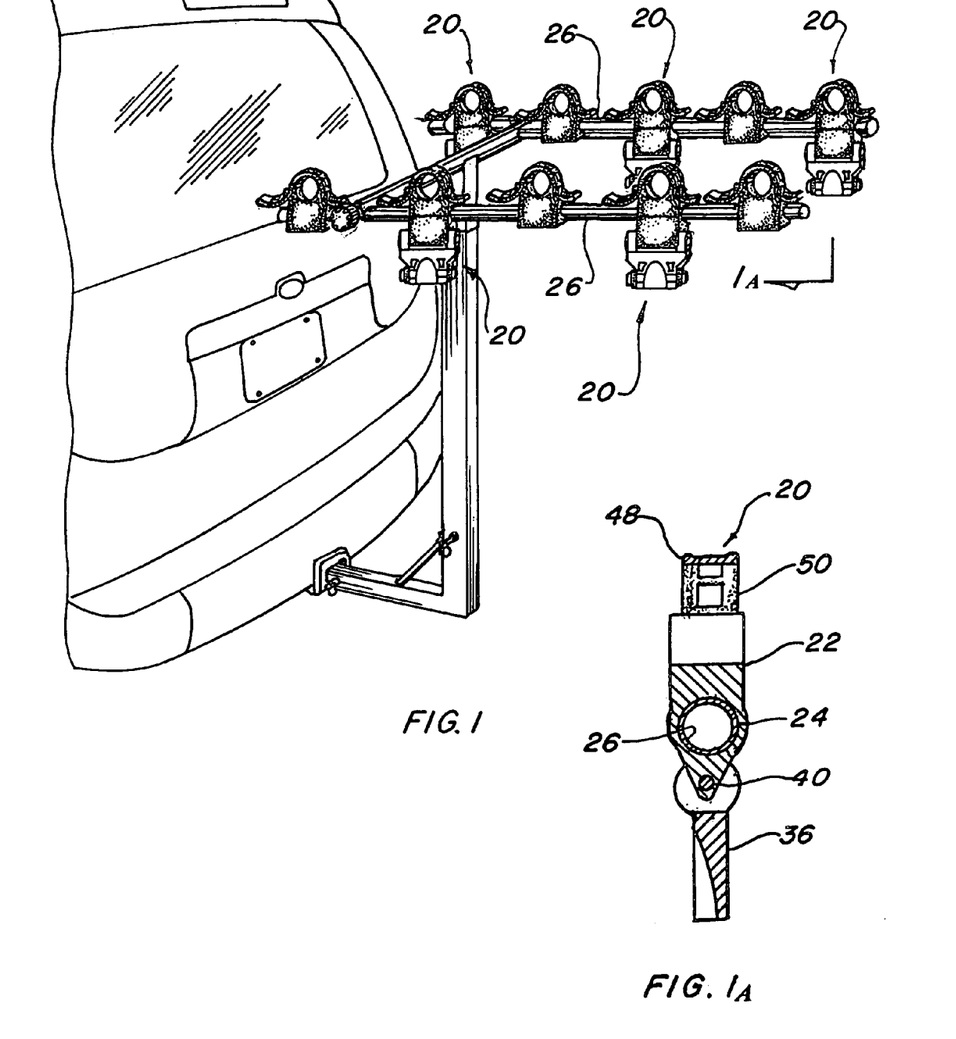
FIG. 1 is a partial isometric view of the preferred embodiment fastened onto a dual arm bicycle rack that has been connected into a vehicle receiver hitch.
FIG. 1A is an enlarged cross sectional view of the preferred embodiment taken along lines 1A of FIG. 1.
Figure 2:
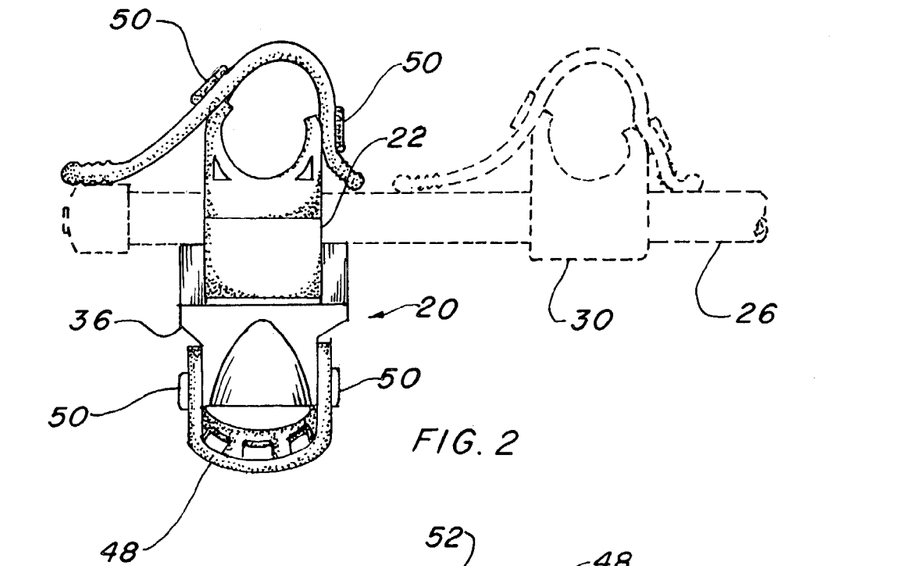
FIG. 2 is a front view of the anti-sway stabilizer mounted on a portion of a support arm of a bicycle support rack along with a conventional rubber bike separator that has been illustrated with dotted lines.
Figure 3:
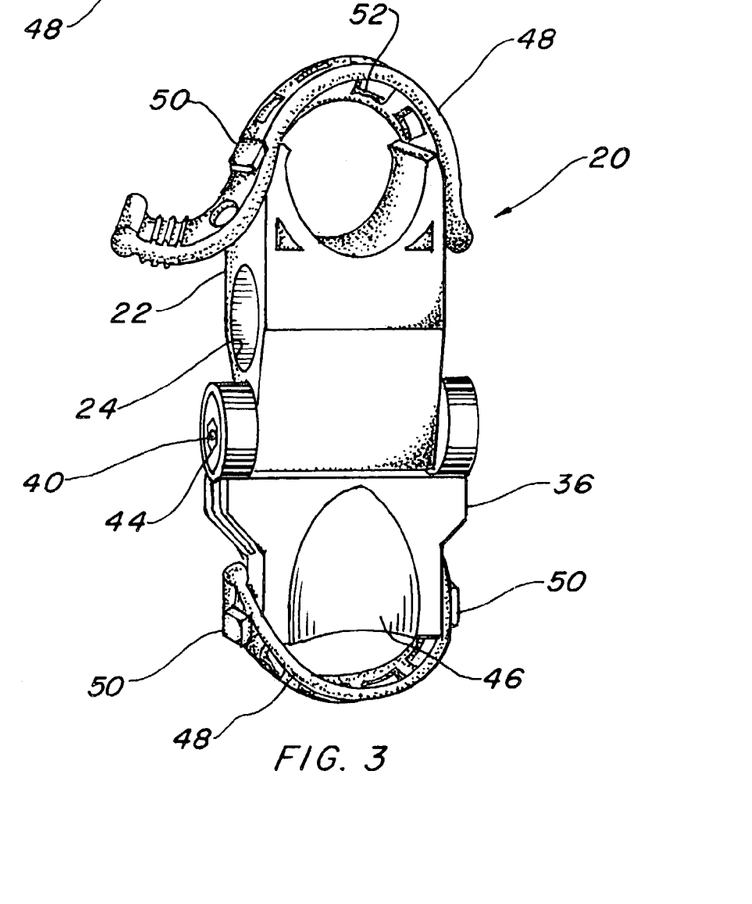
FIG. 3 is a partial isometric view of the preferred embodiment shown separately.
Figure 4:
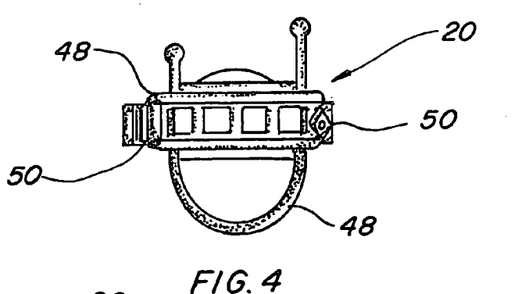
FIG. 4 is a top view of the preferred embodiment.
Figure 5:
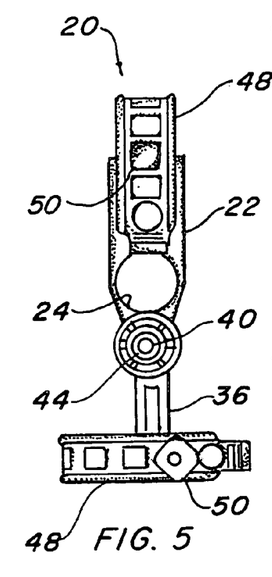
FIG. 5 is a left side view of the preferred embodiment.

The first element is a rubber bike separator cradle 22 that includes a bore 24 therethrough with a size and configuration that is adaptable to slide over a vehicle bike rack support arm 26 as shown in FIGS. 1 and 2. This separator cradle is different than a conventional rubber cradle in that it is elongated and includes a thru-hole 28 that is parallel to the bore 24 as illustrated in FIGS. 3, 5–7, and 9.

The bore 24 in the bike separator cradle 22 has a smaller inside diameter than the rack support arm 26 outside diameter producing a friction fit, however, due to the elasticity of the rubber material forming the bike separator cradle 22, the cradle expands sufficiently to produce a tight grip which helps to keep the alignment of the cradle 22 on the arm 26, as depicted in FIG. 1A. An alternate method of forming a tight grip of the bike separator cradle on the rack support arm is by compression from a constructing device such as a threaded fastener, or the like. The bike separator cradle 22 is molded of a resilient rubber material and formed in a semi-circle that is larger than a bicycle top tube 27, permitting a bicycle to be disposed within the cradle 22 without any undo interference.

Figures 6, 7:
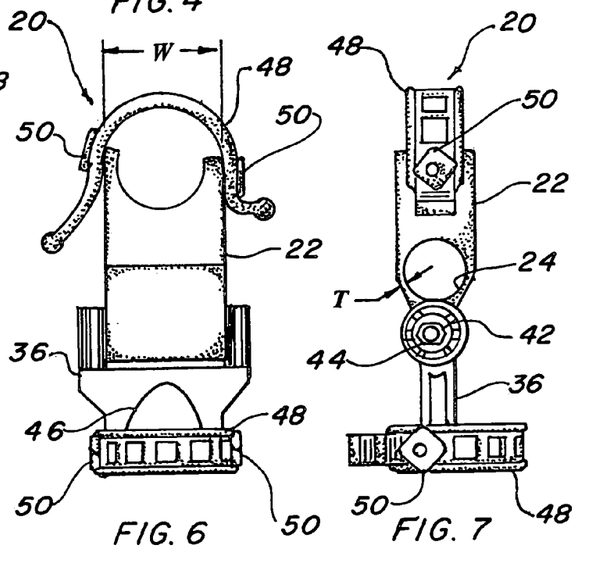
FIG. 6 is a front view of the preferred embodiment.
FIG. 7 is a right side view of the preferred embodiment with the wall thickness, width of, the yoke and separator cradle identified.
Figure 8:
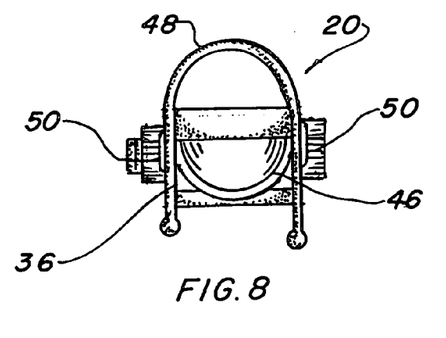
FIG. 8 is a bottom view of the preferred embodiment.
Figures 9, 10:
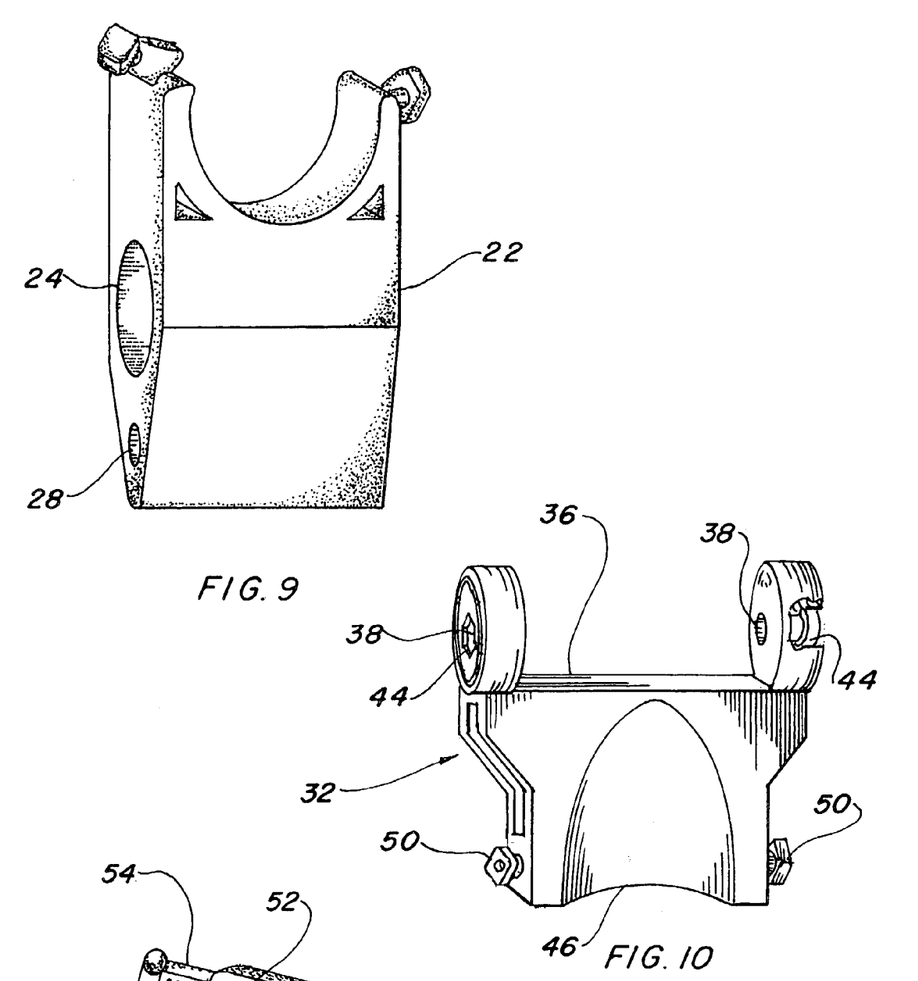
FIG. 9 is a partial isometric view of the rubber bike separator saddle completely removed from the invention for clarity.
FIG. 10 is a partial isometric view of the rigid stabilizer member completely removed from the invention for clarity.
Figure 11:
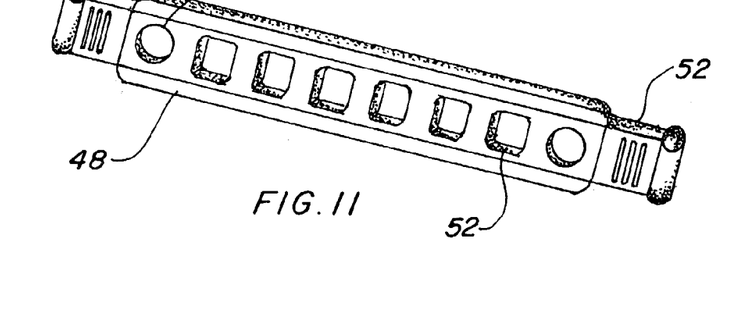
FIG. 11 is a partial isometric view of the resilient attachment strap completely removed from the invention for clarity.
Figure 12:
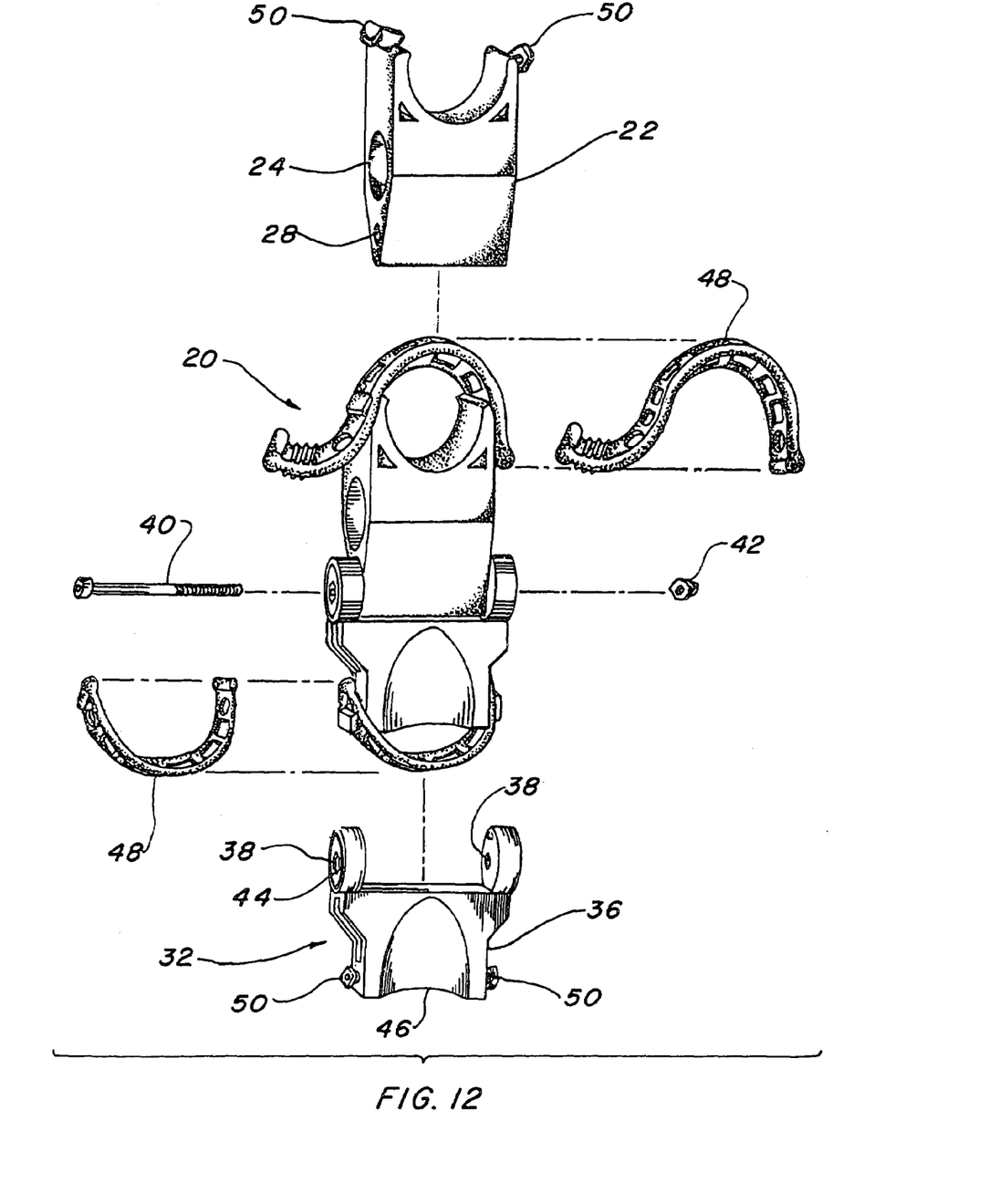
FIG. 12 is an exploded view of the preferred embodiment.

The bike separator cradle 22 preferably has, a wall thickness, designated "T", between the bore 24 and the outside surface of the cradle 22, as illustrated in FIG. 7, of at least 0.190 inch (0.48 cm). The cradle 22 has an overall horizontal width of from 1.90 inch (4.83 cm) to 2.10 inch (5.33 cm) as shown with the designation "W" in FIG. 6. It will be noted that a conventional separator cradle, or a so called saddle mount 30, as shown in the prior art example in FIG. 13, has no such thru-hole 28 and the lower portion of the bore 24 has the same basic thickness as the sides. It should also be realized that a conventional saddle mount 30 is in common usage today with many manufacturers using the same fundamental design and similar basic configurations.

The second major element of the anti-sway stabilizer 20 is a pivoting stabilizer member 32 that is rotatably attached to the rubber bike separator cradle 22. While others have attempted to produce the same function of preventing bicycle sway, their approach has been to utilize a completely separate element attached directly to the bicycle rack support arm 26, described by others as a stabilizer apparatus 34, such as shown in the prior art drawing of FIG. 13.

The improved pivoting stabilizer member 32 of the instant invention is shown in FIGS. 2–8, 10, and 12. The stabilizer member 32 consists of an integrally formed radial yoke 36 having a pair of aligned round openings 38 therethrough. The upright portions of this bifurcated yoke 36 are sized to fit over the outside of the bike separator cradle 22 with the round openings 38 in alignment with the thru-hole 28 in the cradle 22. An important part of the invention is that the inside surface of the yoke 36 is narrower than the width of the separator cradle 22, creating an interference fit which is permitted by the resilience of the separator cradle 22, thereby allowing the stabilizer member 32 to rotate under resistance, therefore maintaining its radial position under compression of the rubber material.

The stabilizer member 32 is pivotally attached to the separator cradle 22 with a capscrew 40 and nut 42, with the capscrew 40 disposed within the thru-hole 28 in separator cradle 22. Both the head of the capscrew 40 and the nut 42 align with and are retained in a stepped cavity 44 on each outside surface of the round openings 38 in the stabilizer member 32. It has been found that the nut 42 and capscrew 40 captivated in the yoke 36 function best using the ¼-28 size with the nut 42, preferably, the locknut type and the screw 40 the socket head type.

The stabilizer member 32 has an integrally formed recess 46 configured with an angle that conforms to the angle of a bicycle seat tube or down tube and the entire stabilizer member 32 is preferably injection molded of ABS (which is a formulation of acrylonitrile, butadiene and styrene).

Another very important aspect of the invention is embodied in the relationship of the stabilizer member 32 and the separator cradle 22 to the vehicle bike transportation rack support arm 26. The stabilizer member 32 contiguously engages the vehicle bicycle support arm 26 through the bore 24, the combination of the separator cradle 22 being resilient and the stabilizer member 32 being rigid produces a biasing action urging the stabilizer against the support arm 26. This relationship precludes any lateral movement along the arm 26 when the force of the resilient material is exerted in a horizontal direction on the anti-sway stabilizer 20. What actually happens is that when the anti-sway stabilizer 20 is physically pulled to one side by the inertia of the vehicle stopping and starting, the yoke 36 of the stabilizer member 32, being rigid, engages the adjacent radial surface of the support arm 26. The opposite radial surface of the yoke 36 pulls away from the arm 26, permitted by the resilience of the separator cradle 22, forcing the opposed contiguous surface tightly into the support arm 26 while simultaneously biasing the cradle 22 on the arm 26, therefore excluding any lateral movement.

Attaching means are utilized for securing a bicycle top tube to the bike separator cradle 22, which are in the form of an attachment strap 48 connected to the cradle 22 which includes a pair of opposed integrally molded strap anchors 50. The attachment strap 48 and strap anchors 50 are well known in the art and in common usage in today's industry. The same type of attachment strap 48 and opposed integrally molded strap anchors 50 are used for securing the radial yoke 36 to a bicycle seat tube or down tube completing the grip of the stabilizer member 32 onto a bicycle.

The attachment strap 48 further includes a plurality of openings 52 corresponding to the shape of the strap anchors 50, except smaller, permitting a button and buttonhole type of connection. Each strap anchor 50 also has a gripping tab 54 on each end, providing the user a convenient grasping surface. The attachment strap 48 is preferably molded of Santoprene rubber of the same formulation as the cradle 22.

The initial installation of the anti-sway stabilizer 20 to a bike carrier support arm 26 is accomplished by removing the end cap on the support arm 26 and introducing the bike separator cradle 22 to the arm 26 by sliding the cradle 22 on the arm 26 through the bore 24 and positioning it as desired on the arm 26. Where two arms 26 are used the opposite arm 26 receives a conventional saddle mount 30 in direct alignment with the cradle 22. Multiple stabilizers 20 and mating saddle mounts 30 are installed in opposed combinations so as to have bicycles facing in different directions, as illustrated in FIG. 1.

When the anti-sway stabilizers 20 and saddle mounts 30 are installed, a bicycle is placed in the cradle 22 and conventional saddle mount 30 which mates the bicycle top tube and the seat tube or down tube with the respective separator cradle 22 and saddle mount 30, according to the direction the bicycle is facing. The appropriate attachment straps 48 are then connected to the strap anchors 50 and the bicycles are set up ready for transportation.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. An anti-sway stabilizer for pivotally connecting to a support arm of a vehicle bike transportation rack, providing attachment for a bicycle top tube in conjunction with a seat tube or a down tube to prevent a bicycle held on the rack from swaying to and fro when subjected to over the road vehicle movement, comprising, a rubber bike separator cradle having a bore therethrough, configured to slide over a vehicle bike rack support arm, further, said separator cradle having a thru-hole parallel with the bore, a pivoting stabilizer member rotatably attached to the bike separator cradle utilizing the thru-hole, such that the separator cradle and pivoting stabilizer combination precludes lateral movement along a vehicle bike rack support arm, said pivoting stabilizer member further comprising an integrally formed radial yoke having a pair of aligned round openings therethrough with said yoke sized to fit tightly over the bike separator cradle with the round openings aligning with the thru-hole in the cradle, wherein, said yoke is narrower than the separator cradle width, creating an interference fit permitted by resilience of the separator cradle allowing the stabilizer member to rotate under resistance therefore maintaining its position under compression, wherein said stabilizer member is pivotally attached to said separator cradle with a capscrew and nut disposed within the thru-hole in separator cradle and the aligned round openings in said stabilizer member, wherein said nut is captivated in said yoke and said capscrew is the socket head type, and attaching means for securing a bicycle top tube to the bike separator cradle, also attaching means for securing to a bicycle seat tube or down tube to the stabilizer member.

2. The anti-sway stabilizer as recited in claim 1 wherein said bore in the bike separator cradle has a smaller inside diameter than a rack support arm outside diameter, wherein a friction fit is achieved due to the rubber material elasticity, forming the bike separator cradle, when expanded over the rack support arm, such that a tight grip is provided therebetween.

3. The anti-sway stabilizer as recited in claim 1 wherein said bike separator cradle is molded of a resilient rubber material.

4. The anti-sway stabilizer as recited in claim 1 wherein said rubber bike separator cradle further having a wall thickness between the bore and an outside surface of the cradle of at least 0.190 inch (0.48 cm) and a overall horizontal width of from 1.90 inch (4.83 cm) to 2.10 inch (5.33 cm).

5. The anti-sway stabilizer as recited in claim 1 wherein said stabilizer member further having an integrally formed recess configured with an angle compatible with that of a bicycle seat tube or down tube.

6. The anti-sway stabilizer as recited in claim 1 wherein said stabilizer member is injection molded of ABS which is derived from acrylonitrile, butadiene and styrene.

7. The anti-sway stabilizer as recited in claim 1 further comprising said stabilizer member contiguously engages a vehicle bicycle support arm, with a combination of the separator cradle being resilient and the stabilizer member rigid, when a force is exerted in a horizontal direction the separator cradle and stabilizing member are biased precluding any lateral movement along the support arm.

8. The anti-sway stabilizer as recited in claim 1 further comprising, said separator cradle and stabilizer member each having a pair of opposed integrally molded strap anchors, said attaching means for securing a bicycle top tube to the bike separator cradle, also attaching means for securing to a bicycle seat tube or down tube to the stabilizer member further comprise an attachment strap having a plurality of openings corresponding to the shape of the strap anchors except smaller.

9. The anti-sway stabilizer as recited in claim 8 wherein said attachment strap further comprising, gripping tabs on each end for providing a user a convenient grasping surface.

10. The anti-sway stabilizer as recited in claim 8 wherein said attachment strap is molded of a resilient rubber material.

* * * * *